May 17, 1960 M. ROSENBERG 2,937,364

MEMORY SYSTEM

Filed Dec. 21, 1954 2 Sheets-Sheet 1

INVENTOR.
MILTON ROSENBERG
BY Lyon & Lyon
ATTORNEYS

May 17, 1960 M. ROSENBERG 2,937,364

MEMORY SYSTEM

Filed Dec. 21, 1954 2 Sheets-Sheet 2

INVENTOR.
MILTON ROSENBERG
BY Lyon & Lyon
ATTORNEYS 2,937,364

MEMORY SYSTEM

Milton Rosenberg, Santa Monica, Calif., assignor, by mesne assignments, to Telemeter Magnetics, Inc., a corporation of California Application December 21, 1954, Serial No. 476,748

8 Claims. (Cl. 340—174)

This invention relates to magnetic memory systems, and more particularly is an improvement in an arrangement for writing information into such systems.

In an article published in the magazine Electronics for April 1953, entitled Ferrites Speed Digital Computers, by Brown and Albers-Schoenberg, which magazine is published by the McGraw-Hill Book Company, there is a description of a three-dimensional array for a magnetic-core memory. Essentially what this consists of is an array of cores which are saturable in opposite polarities and which have substantially rectangular hysteresis characteristics. There are a plurality of these arrays of magnetic cores which are simultaneously driven by driving means which select one core in each array. This core in each array is placed in either one or the other saturation state, designated as P or N, depending upon the data to be stored. This data is in the form of a binary code with, for example, the P representing "0" and the N representing "1". The presently favored program employed for driving a three-dimensional memory array usually consists of a cycle whereby in the first portion of the cycle a selected core in each array receives magnetomotive forces to drive it toward P. Each array has its own reading winding. Accordingly, those cores which are already in P are only slightly disturbed. Those cores which are in N are driven toward P by this initial drive and induce a voltage in the reading winding of the array. The next drive, which is the second portion of the cycle, is usually an N-drive. Since all the cores are in P, this N-drive would turn all the cores to N. However, those cores that are to be left in P are so maintained by applying an inhibiting current to a coil in each array which has been variously termed as the inhibiting coil or the digit-plane coil. Thus, a current is applied to this inhibiting coil which provides a magnetomotive force which prevents the core in the particular array from going to N.

The driving arrangement for the three-dimensional array of memory core planes has many variations. However, in essence, there are two types. One is the type of drive whereby a core in each array receives two half drives, one from one side of all the parallel arrays and the other from one side of each one of the arrays, and the core located in each array, where the two half drives intersect, may be considered the core which has been selected. Another type of drive is to apply a full P-going magnetomotive force from one side of all of the planes to a particular core in each plane. This is followed by a full N-going drive. An inhibiting current is or is not applied to the inhibiting coil in each plane, as determined by the information to be stored.

When the cores coupled to a coil are simultaneously driven, it is found that the load presented to the driving source varies with the number of cores of all those being driven which are turned over by the driver. In other words, if an N-drive is to be applied to a given group of cores, the load on the source varies with the number of cores of that group which are not to be driven by that N-drive because they are already in N or are being inhibited to remain in P. In order to secure a proper drive, it is necessary to minimize such load variations. This is especially true if the drive applied to a group of cores is obtained from a switch core. Accordingly, in a magnetic-core memory wherein one core in each plane is coupled to a driving coil, this coil is terminated in a resistor. This resistor is selected to have a value high enough so that the core load variations are insignificant when compared to this value. However, since the drive required for ferrite cores is rather heavy, being on the order of one ampere turn, the resistor must also have a substantial wattage rating. Another function which such resistor serves is to provide a damping for the currents induced in the driving coil following termination of a drive. Another factor which dictates that the load be constant so that the driving current is maintained substantially constant is that, where an inhibiting current is required, the amplitude of the inhibiting current to overcome the effect of the driving current must be determinable and fixed. Otherwise, either the inhibiting current alone will drive a core or the driving current will be effective and the inhibiting current will be inoperative. It will be appreciated, therefore, that the requirement for a constant load with presently known techniques dictates that resistors be used to terminate the driving coils of a magnetic-core memory. Since magnetic-core memories have a large number of coils wherein load variations must be minimized, these terminating resistors are an item of expense. But the really costly factor involved is the large waste of power necessarily dissipated in these terminating resistors. The driving tubes which are required are also, of necessity, large and expensive.

It is an object of this invention to provide an improved magnetic-core memory construction.

It is a further object of the present invention to provide an improved writing system for a magnetic-core memory system.

Still a further object of the invention is to provide a writing system for a magnetic-core memory which enables a reduction in the cost of the construction as well as operation.

These and further objects of this invention are achieved in a memory system of the type described wherein the information which is to be written into the memory is employed to control the amplitude of the driving current required. Since this information is at all times available prior to the write-in, this may be readily achieved.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
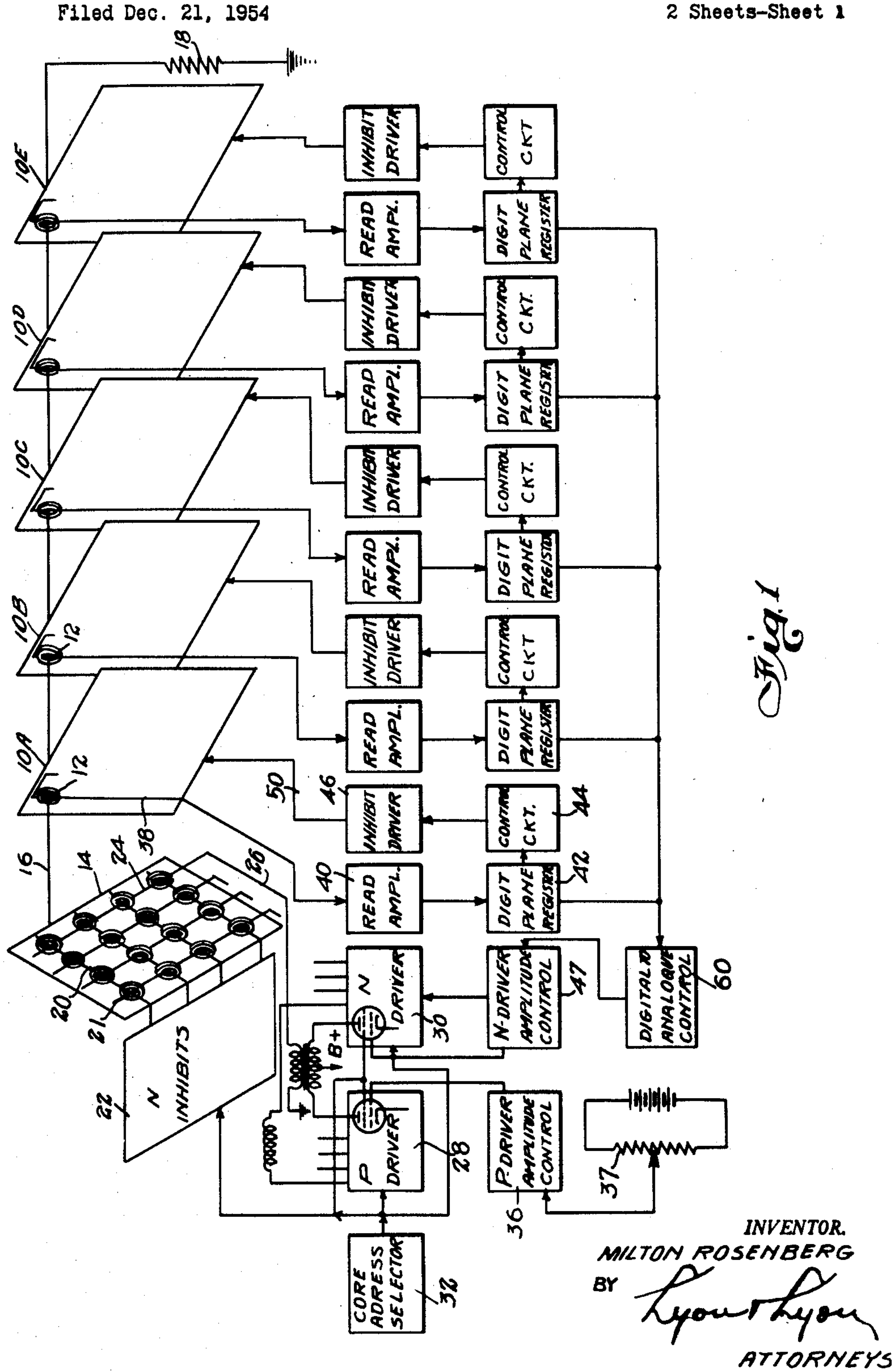
Figure 1 is a block diagram of a memory system including an embodiment of the invention.

Referring now to Figure 1, a magnetic memory system of the type intended may consist of a plurality of magnetic-core arrays 10, 10A, 10B, 10C, 10D, and 10E. Each array consists of the well known arrangement of cores 12 in columns and rows. The cores are toroidal in shape and preferably have a substantially rectangular hysteresis characteristic. A typical arrangement of a plane may be seen in the previously noted reference. A magnetic switch array 14 is employed to drive the memory arrays from one side. The magnetic switch consists of a plurality of magnetic cores 21 which are arranged in rows and columns in similar fashion to the arrangement in the memory planes. The switch cores are usually larger than the memory cores and each switch core has an output coil 16 which is coupled to one core 12 in each memory array. The output coil 16 is terminated with a resistor 18. It will be appreciated that there are as many switch cores in the array as there are memory cores in a single memory plane, that each switch core is coupled to one memory core in each array by an output coil which terminates in a resistor. Only one memory core in each plane is shown to make the explanation of the drawing, as well as the drawing itself, simple. As many cores as are desired may be employed in the switch array and the memory array.

Each row of cores in the switch array has coupled thereto what may be termed a row coil 20. Each row coil in the standby condition of the switch core array has applied thereto an inhibiting current from an inhibit current source 22. Each column of cores in the switch core array is coupled to a separate column coil 24. These column coils terminate in the secondary of a transformer 26. The primary of the transformer has one side connected to an output from a rectangle labeled as the P-driver 28, and the other side is connected to a rectangle labeled as the N-driver 30. These P- and N-drivers consist of a plurality of vacuum tubes which may be of the multi-control grid type. The plate of one tube in the P-driver and one tube in the N-driver is, respectively, coupled to the two ends of the primary of the transformer 26. The primary is center tapped and has B+ applied thereto.

Accordingly, if it is desired to drive a switch core toward P polarity, an address selector 32, which may consist of any arrangement of gates and flip-flop circuits for selecting the desired P-driver, enables the desired tube to conduct. The amplitude of the current provided by that tube is determined by a P-driver amplitude control source 36, which is connected to all the P-driver tubes for that purpose. This P-driver amplitude control may consist of a power tube which is capable of driving the enabled P-driver tube so that sufficient power is provided to turn over the switch core selected as well as all the memory cores coupled thereto. The amplitude of the drive from the P-driver amplitude control is determined by a bias source 37. The above broadly described arrangement is well known in the art and need not be further described here. The N-driver 30 may consist of the identical arrangement as the P-driver. It will be appreciated that when an N-driver tube, which has been selected, conducts, the current applied to the selected column coil through the transformer 26 flows opposite to the current drawn by the P-driver tube. In this manner, a selected switch core may be driven to P or N, as desired.

The manner of selection is to first employ the information from the address selector to turn off the inhibit current to the row of cores containing the desired switch core 21. Then address information enables one of the P-drive tubes. The P-driver amplitude control then drives this tube to apply the required P-drive. This turns over the switch core 21 to P. None of the other switch cores in the selected column are driven in view of the fact that the inhibit currents are still being applied to them. The selected switch core, in turning over to P, induces a current in the output coil 16, which drives all the cores coupled thereto to P. This first P-drive is usually employed for reading the information stored in the cores.

Figure 2:
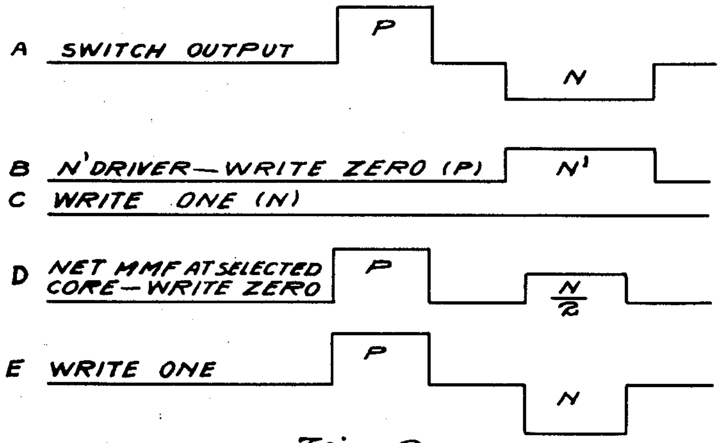
Figure 2 is a wave shape diagram which is presented to assist in an understanding of the invention.

As shown in Figure 2A, the output of the switch core is a P-pulse. This P-pulse has sufficient energy to turn over or drive to P all the memory cores coupled to the output coil. The amplitude of this drive can exceed that required for this purpose, since there is no "matching" of an inhibiting drive employed at this point. A reading coil 38 in each memory plane is coupled to all the cores in that plane. If a memory core in a plane is already at P, no voltages will be induced in the associated reading coil as a result of the P-drive. If a memory core is at N, the voltages induced in the reading coil by this core being driven to P are amplified by the read-amplifier 40 and are entered into the digit plane register 42, which may consist of a flip-flop. This flip-flop is driven from a first to a second condition of stability by the output of the read-amplifier.

After reading, since the information stored in the memory is destroyed, it is necessary to restore the information. This is performed in the writing phase of the memory program. Accordingly, the output of the flip-flop for each memory plane is applied to an associated control circuit 44. This may consist of a tube, which is enabled by the register, attaining an indicating condition. This control circuit drives an inhibit driver 46 for the memory plane where required. The address selector enables an N-driver tube which is driven by the N-driver amplitude control and applies an N-drive to the same switch core 21. As shown in Figure 2A, an N-pulse is induced in the output coil 16. If the memory core in a plane is to remain in P, the inhibit driver 46 supplies an inhibit pulse, as shown in Figure 2B, which opposes the drive from the N-going pulse and thus maintains that memory core in P. Otherwise, if it is desired to write N, no inhibit drive is applied to the digit coil 50 of the array as represented by Figure 2C. It will be appreciated that whether or not an inhibit driver applies a current is determined by the information obtained from the digit plane register. The respective registers may either rewrite the information destroyed by the readout process or may be set to write new information into the memory as desired. The width of the pulse applied to drive the switch core to N is made wider than the width of the pulse to drive the switch core to P for reasons which will appear later.

Figures 2D and 2E, respectively, show the net magnetomotive force required of a switch for a core which is to be driven to 1 or N and which is to be driven to 0 or P. A core which is not turned over has substantially the effect of an inductance on the driving source. A core which is turned over has substantially the effect of a resistive load on the driving source. This resistive load causes a higher drop in voltage than the voltage drop which occurs when a core is not turned over. It will thus be appreciated that since the number of cores which must be turned over by the N-going output from a switch core may vary, from no cores to the total number of cores coupled to the output coil dependent upon the information to be stored, the load variation is quite large.

The N-drive current must be substantially constant. If the N-drive current is too large, the inhibit current, which is a constant, will have no effect. If the N-drive current is too small, it will not drive the cores to N which should be driven to N. The amount of the driving current obtained from the switch core is determined, for a given drive, by the load on the switch core output coil. If this varies, driving current varies. Heretofore, to maintain such driving current constant, it was necessary to employ the resistor 18, which, as previously described, was given such a high value as to render substantially insignificant the variable switch core load occasioned by the variations in the information to be written into the memory cores.

In the embodiment of the invention envisioned herein, the digital information in each digit plane register may be employed to establish an analog voltage, using the digital-to-analog converter 60. This digital-to-analog converter provides a voltage signal which controls the amplitude of the drive obtained from the N-driver amplitude control 47. Thus, if the digit plane registers indicate that only three of five memory cores are to remain in P, the N-driver amplitude control provides sufficient drive through the N-driver 30 so that switch core 21 is driven with sufficient energy for the switch core to be turned over and to also supply the output required to turn over only two memory cores.

Thus, the energy transmitted through the switch core is only sufficient for the required purpose and is not overly sufficient and dissipated wastefully. The amount of drive supplied is determined here by the amount of drive required. The resistance value of resistor 18, with this embodiment of the invention, is lowered sufficiently to provide a good impedance match between the switch core as the driving source and its load. With the reduction in value of the resistor 18, obviously its wattage requiments are reduced considerably. The N-going drive applied to the switch core selected is made over a sufficient interval so that, when the analog control voltage indicates that a minimum memory core drive is required, enough drive is applied to the switch core to restore it to its initial condition before being driven to P. Since the amplitude of the N-drive may be far less than the P-drive, with this system the width of the N-driving pulse is determined, in effect, by the minimum amplitude to be used in the system embodying the invention. This minimum amplitude versus width requirement for the switch core driving pulse is determined, in turn, by the total flux or magnetomotive force required to restore the switch core to the portion of its hysteresis characteristic curve from which it was driven by the P-drive.

Figure 3:
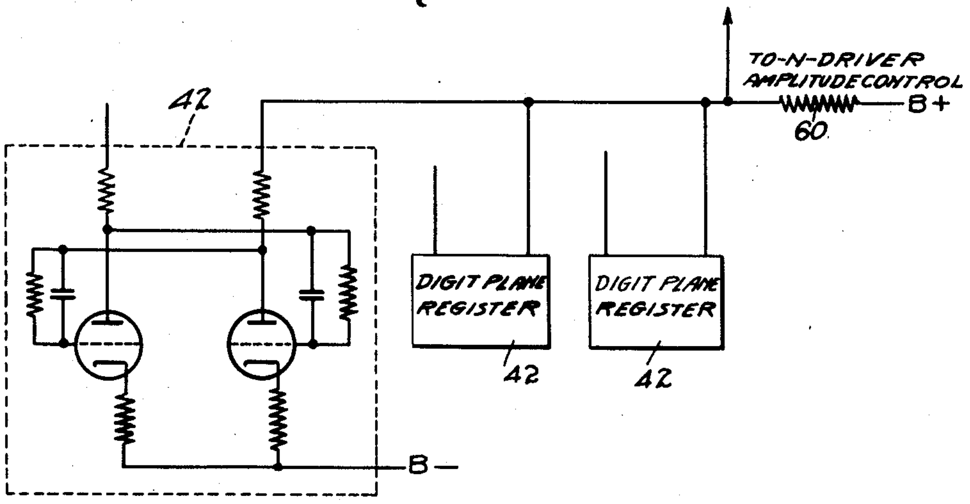
Figure 3 is a schematic diagram of a digital-to-analog converter system which may be employed in the embodiment of the invention.

Figure 3 is a schematic of a digital-to-analog converter. Since each digit plane register 42 consists of a flip-flop circuit which, as shown in detail in the first digit plane register, consists of two tubes interconnected after the well known Eccles-Jordan arrangement, one tube of each flip-flop may be connected through a resistor 60 to the source of B+. The conduction or nonconduction of the tubes connected to this resistor represents the digital information to be written into the register. The current drawn by all the conducting tubes through this resistor thus also constitutes an indication of the digital information to be entered into the memory. The voltage across this resistor is an analog representation of such digital information. It may be employed to control the drive provided by the N-driver amplitude control to the enabled N-driver tube in well known manner, either by controlling the bias applied or controlling the amount of feedback in a feedback arrangement. The control provided by the analog signal should vary preferably linearly with variations in the analog signal. This would insure that the output of the switch core varies linearly with the load it is required to drive, and thus the driving current is regulated.

The energy employed to drive the switch cores is considerably less with this system than with that used hitherto because of the fact that the terminating resistance value for the output coil is considerably less and the energy required for driving the memory is proportionately less. Thus, the size of the N- and P-driving tubes may also be reduced, thus further decreasing the cost of the memory.

Accordingly, there has been shown and described herein a novel, useful, and improved system for writing information into a magnetic-core memory which achieves a reduction in construction cost, as well as economy in operation and maintenance.

I claim:

1. In a magnetic memory system of the type wherein a plurality of magnetic-core memory arrays are selectively driven for reading or writing, by a switch core array an improved writing system for said memory system comprising means to establish digital data to be written into said memory arrays, and means to control the amplitude of drive for writing by said switch core array responsive to said digital data.

2. In a magnetic memory system of the type wherein a plurality of magnetic-core memory arrays are selectively driven for reading or writing, an improved writing system for said memory system comprising means to establish digital data to be written into said memory arrays, means to convert said digital data to analog data, and means to control the amplitude of drive for writing responsive to said analog data.

3. In a magnetic-core memory system of the type wherein a plurality of magnetic-core memory arrays are selectively driven for reading and writing, and digital data read from the memory arrays is stored in a register to control the rewriting of said data back into said core memory, the improvement in said writing system comprising means to convert the digital data stored in said register to analog voltage representation, means to selectively apply a writing drive to a desired one of the cores in each of said arrays to establish the digital data in said register in said desired ones of cores in said core memory arrays, and means to control the amplitude of said drive responsive to said analog voltage representation.

4. In a magnetic memory system of the type wherein a plurality of magnetic-core memory arrays are driven for reading or writing by a plurality of magnetic switch cores, an improved writing system comprising a different flip-flop circuit associated with each core memory array, each said flip-flop having two stable states, means to establish each flip-flop into one of its two stable states in accordance with digital data to be written into an associated memory array, means to convert the stable states of said flip-flops into an analog form, and means to control the amplitude of drive for writing said data by said switch cores responsive to said analog data form.

5. In a magnetic-core memory system of the type wherein a plurality of magnetic-core memory arrays are driven for reading or writing by a plurality of magnetic switch cores, an improved writing system comprising a flip-flop circuit associated with each core memory array, each said flip-flop having two stable states, means to establish each flip-flop into one of its two stable states in accordance with digital data to be written into an associated memory array, means to establish a voltage responsive to said flip-flop stable states having an amplitude representative of said digital data, and means to control the amplitude of drive for writing said data by said switch cores into said memory array responsive to said voltage.

6. In a magnetic-core memory system of the type wherein a plurality of magnetic-core memory arrays, each having a reading core, are driven for reading or writing by a plurality of magnetic switch cores, an improved writing system comprising a different flip-flop for each of said core memory arrays, each of said flip-flops having two stable states, means to selectively apply a drive to one of said switch cores to apply a drive toward one polarity to a desired core in each memory array whereby a voltage is induced in the reading coils of those memory arrays in which said desired cores are not in said one polarity, means to establish each of said respective flip-flops in one of said two conditions responsive to a voltage induced in the reading coil of an associated core memory array, the remaining flip-flops remaining in said other of said two conditions, means to establish an analog voltage having an amplitude representative of the number of flip-flops in said one condition, and means to apply a drive to said one of said switch cores having an amplitude controlled by said analog voltage to apply a drive toward the opposite polarity to said desired cores in said memory arrays.

7. In a magnetic memory system of the type wherein a plurality of magnetic-core memory arrays, each having a reading coil, are selectively driven for reading or writing by selectively driving one of a plurality of switch cores, an improved writing system comprising means to selectively drive one of said switch cores to drive a desired core in each memory array toward saturation at one polarity whereby a voltage is induced in the reading coils of those arrays wherein said desired cores are not already at said one polarity, a register, means to drive said register to represent digitally the data stored in said desired cores responsive to said reading coil voltages, means to establish a voltage which is an analog representation of said digital representation in said register, and means to drive said one of said switch cores with an amplitude determined by said voltage analog to drive said desired cores toward saturation at the opposite polarity.

8. In a magnetic-core memory system of the type wherein a plurality of magnetic-core memory arrays are driven for reading or writing by a plurality of magnetic switch cores and digital data is stored by the cores being saturated at one or the opposite polarity, an improved writing system comprising means to selectively drive one of said switch cores to drive a desired core in each memory array toward saturation at said one polarity, means responsive to said drive of said desired cores to detect the digital data stored in said desired cores, means to drive said one of said switch cores to drive said desired cores in each memory array toward saturation at said opposite polarity, and means responsive to said detected digital data to determine the amplitude of the drive by said means as that required by the ones of said desired cores to be driven to said opposite polarity.

References Cited in the file of this patent

UNITED STATES PATENTS

| | | |
|---|---|---|
| 2,666,151 | Rajchman et al. | Jan. 12, 1954 |
| 2,819,395 | Jones, Jr. | Jan. 7, 1958 |

OTHER REFERENCES

"Digital Information Storage in Three Dimensions Using Magnetic Cores" by Forrester in Journal of Applied Physics, January 1951 (pp. 46 and 47).

"Thesis on Magnetic Cores" by M. K. Haynes, received by Patent Office, May 12, 1952 (pp. 21–28).

"The M.I.T. Magnetic Core Memory" by W. N. Papian in Proceedings of the Eastern Joint Computer Conference, December 1953 (pp. 37–37).